United States Patent
Sato (10) Patent No.: US 8,570,563 B2
(45) Date of Patent: Oct. 29, 2013

(54) APPARATUS, SYSTEM, METHOD AND COMPUTER READABLE MEDIUM IN WHICH INFORMATION IS SELECTIVELY ACQUIRED FROM PRINTING APPARATUS AND PRINT CONTROL APPARATUS

(75) Inventor: Eiichi Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 12/750,809

(22) Filed: Mar. 31, 2010

(65) Prior Publication Data

US 2010/0265540 A1     Oct. 21, 2010

(30) Foreign Application Priority Data

Apr. 17, 2009   (JP) .................................. 2009-101379

(51) Int. Cl.
*G06F 3/12*     (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS

2002/0154328 A1    10/2002  Sato ............................. 358/1.13
2006/0095924 A1 *   5/2006  Inoue ............................ 719/327

FOREIGN PATENT DOCUMENTS

| JP | 2002-312140 | 10/2002 |
| JP | 2006-345325 | 12/2006 |
| JP | 2006-345329 | 12/2006 |

* cited by examiner

*Primary Examiner* — Qian Yang
(74) *Attorney, Agent, or Firm* — Fitzpatrick, Cella, Harper & Scinto (57) ABSTRACT

A printing apparatus and print control apparatus acquire apparatus information required to specify each other's apparatuses by exchanging them. An information processing apparatus determines with reference to a database which stores data to be set in a printer driver and information indicating acquisition source of the data in association with each other whether data to be set in the printer driver is acquired from the printing apparatus or print control apparatus. The information processing apparatus acquires data from the determined printing apparatus or print control apparatus and causes the acquired data to be reflected in the settings of the printer driver.

10 Claims, 7 Drawing Sheets

APPARATUS, SYSTEM, METHOD AND COMPUTER READABLE MEDIUM IN WHICH INFORMATION IS SELECTIVELY ACQUIRED FROM PRINTING APPARATUS AND PRINT CONTROL APPARATUS

BACKGROUND OF THE INVENTION

1. Field of the Invention

The present invention relates to a printing system which prints a document, a screen generation method of a user interface of a printer driver executed in the printing system, an information processing apparatus and a control method of an information processing apparatus.

2. Description of the Related Art

As a conventional printing system, a system is known whereby when a printing apparatus communicates with a device connected to a network, a print control apparatus relays packets (Japanese Patent Laid-Open No. 2002-312140). Also, as another conventional printing system, a system is known whereby both a print control apparatus and printing apparatus are connected to a first network and the print control apparatus and printing apparatus are connected via a second network (Japanese Patent Laid-Open No. 2006-345329).

Current printing apparatuses have a large number of features, and also many network communication capabilities. For this reason, in the system in which the print control apparatus relays communication packets of the printing apparatus, as described in Japanese Patent Laid-Open No. 2002-312140, due to the increase in processing load on the print control apparatus, large-scale development of the print control apparatus is required. Hence, as described in Japanese Patent Laid-Open No. 2006-345329, the printing system has been proposed having the configuration in which the printing apparatus is also connected to the first network and the print control apparatus does not relay any communications of the printing apparatus.

However, the printing system having the configuration described in Japanese Patent Laid-Open No. 2006-345329 requires server information settings and security settings which have to be made on both the print control apparatus and printing apparatus, thus increasing the burden placed on the user. Furthermore, since items of information of the system are distributed to the print control apparatus and printing apparatus, for example, when the user wants to acquire system information, he or she must perform communication by appropriately selecting the device having desired information, thus also increasing the burden placed on the user.

SUMMARY OF THE INVENTION

An aspect of the present invention is to eliminate the above-mentioned problems with the conventional technology.

The present invention provides a system which includes a print control apparatus and printing apparatus, and can reduce the load on the user, and a screen generation method of a user interface of a printer driver executed in a printing system.

The present invention in its first aspect provides a printing system in which an information processing apparatus that instructs print processing according to settings of a printer driver, a printing apparatus, and a print control apparatus that controls the printing apparatus are connected to each other via a network, the printing apparatus comprising a first acquisition unit configured to acquire apparatus information required to specify the print control apparatus, the print control apparatus comprising a second acquisition unit configured to acquire apparatus information required to specify the printing apparatus, and the information processing apparatus comprising a third acquisition unit configured to acquire the apparatus information of the print control apparatus from the printing apparatus or acquire the apparatus information of the printing apparatus from the print control apparatus, wherein the information processing apparatus determines, with reference to a database which stores data to be set in the printer driver and information indicating acquisition source of the data in association with each other, whether data to be set in the printer driver is acquired from the printing apparatus or the print control apparatus, acquires the data from the determined printing apparatus or print control apparatus using the apparatus information, and causes the acquired data to be reflected in the settings of the printer driver.

The present invention in its second aspect provides a screen generation method of a user interface of a printer driver, which is executed in a printing system in which an information processing apparatus that instructs print processing according to settings of a printer driver, a printing apparatus, and a print control apparatus that controls the printing apparatus are connected to each other via a network, the method comprising the steps of: in the printing apparatus, acquiring apparatus information required to specify the print control apparatus; in the print control apparatus, acquiring apparatus information required to specify the printing apparatus; and in the information processing apparatus, acquiring the apparatus information of the print control apparatus from the printing apparatus or the apparatus information of the printing apparatus from the print control apparatus, wherein the information processing apparatus determines, with reference to a database which stores data to be set in the printer driver and information indicating acquisition source of the data in association with each other, whether data to be set in the printer driver is acquired from the printing apparatus or the print control apparatus, acquires the data from the determined printing apparatus or print control apparatus using the apparatus information, and causes the acquired data to be reflected in the settings of the printer driver.

The present invention in its third aspect provides an information processing apparatus which is connected, via a network, to a printing apparatus and a print control apparatus that controls the printing apparatus, and instructs print processing according to settings of a printer driver, comprising: a determination unit configured to determine, with reference to a database which stores data to be set in the printer driver and information indicating acquisition source of the data in association with each other, whether data to be set in the printer driver is acquired from the printing apparatus or the print control apparatus; and a reflection unit configured to acquire, based on a determination result of the determination unit, the data from the printing apparatus or the print control apparatus, and cause the acquired data to be reflected in the settings of the printer driver.

The present invention in its fourth aspect provides a control method of an information processing apparatus executed by an information processing apparatus which is connected, via a network, to a printing apparatus and a print control apparatus that controls the printing apparatus, and instructs print processing according to settings of a printer driver, the method comprising the steps of: determining with reference to a database which stores data to be set in the printer driver and information indicating acquisition source of the data in association with each other whether data to be set in the printer driver is acquired from the printing apparatus or the print control apparatus; and acquiring, based on a determination result in the determining step, the data from the printing apparatus or the print control apparatus, and causing the acquired data to be reflected in the settings of the printer driver.

According to the present invention, the system including the print control apparatus and printing apparatus can be managed without impairing user convenience.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that the same reference numerals denote the same components, and a repetitive description thereof will be omitted.

Figure 1:
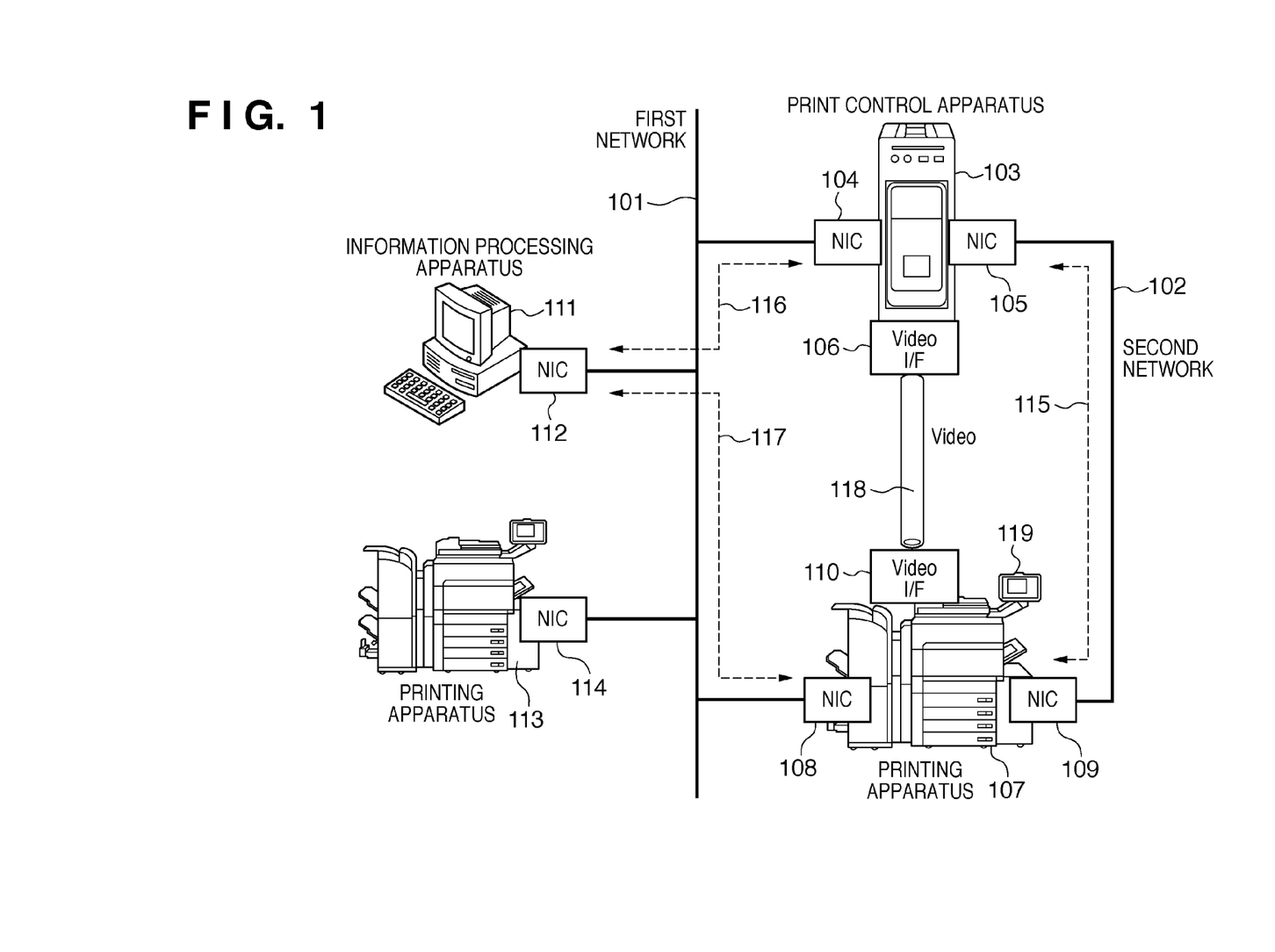
FIG. 1 is a system diagram showing the arrangement of a printing system.

FIG. 1 is a system diagram showing the arrangement of a printing system. A first network 101 is required to allow this printing system to communicate with other network apparatuses (an information processing apparatus 111 and printing apparatus 113). A second network 102 is required to make local communications only between a print control apparatus 103 and printing apparatus 107. The print control apparatus 103 executes, for example, rasterize processing of print data. A NIC 104 connects the print control apparatus 103 to the first network 101. A NIC 105 connects the print control apparatus 103 to the second network 102. An interface card 106 connects the print control apparatus 103 to an interface 118.

The printing apparatus 107 is an image forming apparatus such as an MFP (Multi Function Peripheral) having multiple functions including, for example, a print function, scan function, and various server functions. A NIC 108 connects the printing apparatus 107 to the first network 101. A NIC 109 connects the printing apparatus 107 to the second network 102. An interface card 110 connects the printing apparatus 107 to an interface 118. A NIC 112 connects a general-purpose information processing apparatus 111 to the first network 101. A printing apparatus 113 is connected to the first network 101. A NIC 114 connects the printing apparatus 113 to the first network 101.

Communication data 115 refers to data to be exchanged on the second network 102 between the print control apparatus 103 and printing apparatus 107. Communication data 116 refers to data to be exchanged on the first network 101 between the information processing apparatus 111 and print control apparatus 103. Communication data 117 refers to data to be exchanged on the first network 101 between the information processing apparatus 111 and printing apparatus 107. The interface 118 is used to exchange a video signal and the like between the print control apparatus 103 and printing apparatus 107. An operation panel 119 is used to allow the user to operate the printing apparatus 107.

Figure 2:
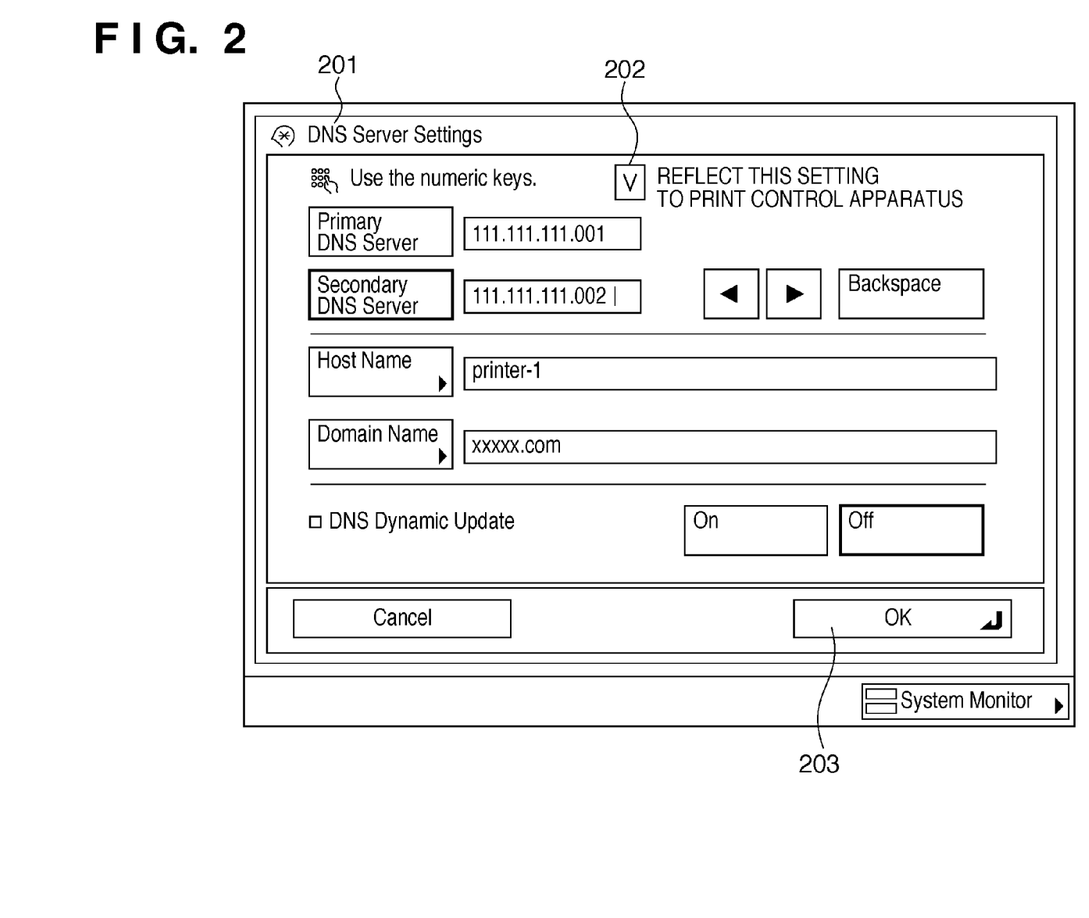
FIG. 2 is a view showing an example of a screen displayed on an operation panel of a printing apparatus.

FIG. 2 is a view showing an example of a screen displayed on the operation panel 119 of the printing apparatus 107. A screen 201 is a DNS server setting screen used to set information regarding DNS servers. A UI 202 is used to control whether or not to cause setting information regarding the printing apparatus 107 set on this screen be reflected on the print control apparatus 103. A button 203 is an OK button pressed to cause the information set on the DNS server setting screen 201 be reflected on the printing apparatus 107.

Figure 3:
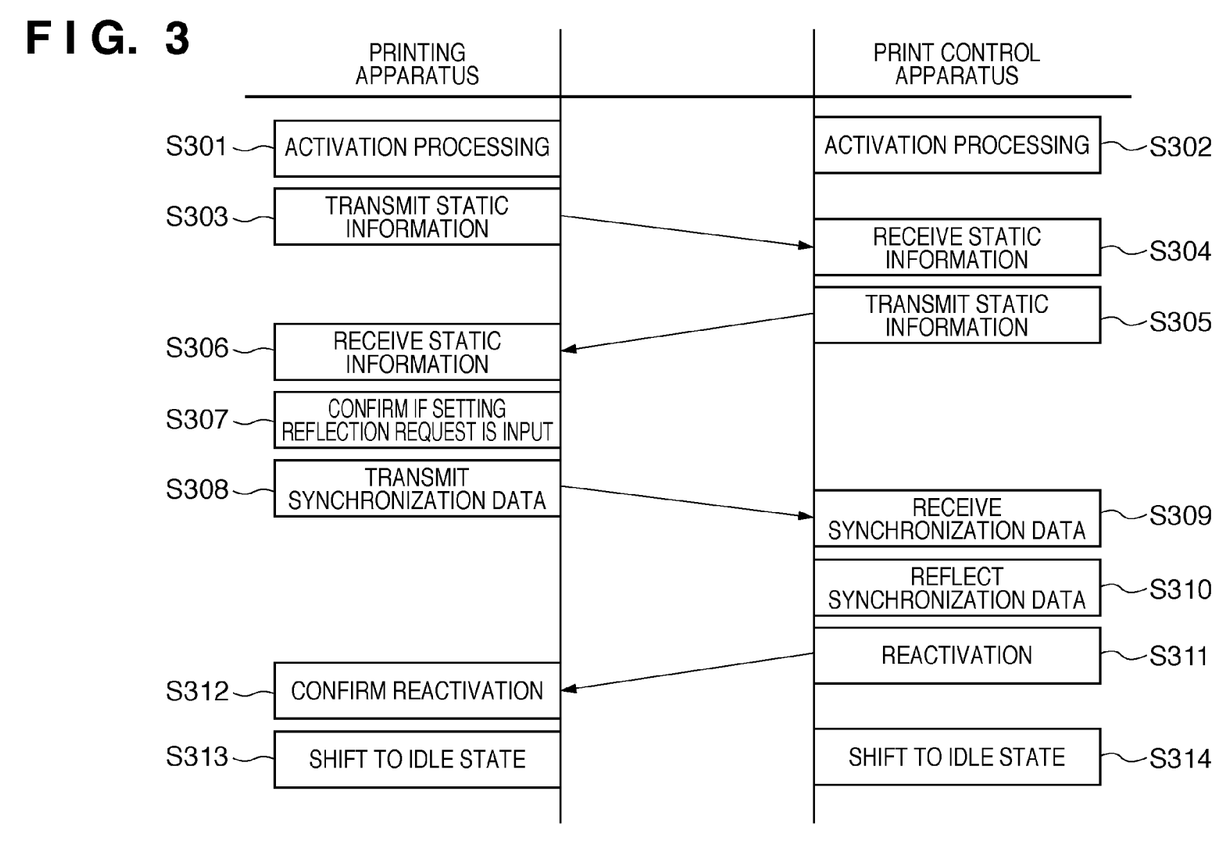
FIG. 3 is a flowchart showing the sequence of processing at the time of activation between the printing apparatus and a print control apparatus.

FIG. 3 is a flowchart showing the sequence of communication processing at the time of activation between the printing apparatus 107 and print control apparatus 103. For example, S301 to S314 indicate steps to be executed in this flowchart. This communication is made via the second network by apparatus control programs installed on the printing apparatus 107 and print control apparatus 103. When the power switch of the printing apparatus 107 is turned on, the printing apparatus 107 executes its activation processing (S301). Likewise, when the power switch of the print control apparatus 103 is turned on, the print control apparatus 103 executes its activation processing (S302).

After activation of the print control apparatus 103, the printing apparatus 107 transmits static information to the print control apparatus 103 (S303). As the static information transmitted at this time, apparatus information to be shared between the printing apparatus 107 and print control apparatus 103 is transmitted irrespective of the will of an administrator. The static information (or apparatus information) includes, for example, an IP address, apparatus name information, apparatus serial number information, and apparatus address information.

Upon reception of the static information transmitted from the printing apparatus 107 (S304), the print control apparatus 103 then transmits static information regarding itself to the printing apparatus 107 (S305). Subsequently, the printing apparatus 107 receives the static information transmitted from the print control apparatus 103 (S306). The communication exchange of the static information executed in steps S303 to S306 need not be executed for every activation processing, since there is may not be static information to be transmitted and since the static information includes fixed data that need not be transmitted every time.

The printing apparatus 107 executes processing for determining whether or not the administrator has input a setting reflection request (S307). This determination processing is done by determining whether or not the UI 202 on the screen 201 is checked. Normally, the printing apparatus 107 includes a large number of network setting items in addition to the DNS server setting items shown in FIG. 2. For example, the printing apparatus 107 includes server settings such as DHCP server settings, time server settings, and mail server settings. Further, the printing apparatus 107 may also include security settings such as IP address filter settings, MAC address filter settings, and communication port block settings. When the user instructs that the settings from these various setting items be reflected on the other apparatus as in the UI 202, these setting items become targets to be reflected.

If it is determined in step S307 that no setting reflection request is input, the process advances to step S313, and the printing apparatus 107 shifts to an idle state. However, if it is determined that a setting reflection request is input, the printing apparatus 107 transmits setting information of items corresponding to the setting reflection request as synchronization data to the print control apparatus 103 (S308). Upon reception of this synchronization data (S309), the print control apparatus 103 causes the acquired setting information to be reflected on itself (S310). In order to enable the reflected setting information, the print control apparatus 103 reactivates itself (S311), and shifts to an idle state (S314). However, after the printing apparatus 107 confirms reactivation of the print control apparatus 103 (S312), it similarly shifts to an idle state (S313).

Note that this embodiment adopts the communication sequence shown in FIG. 3 in consideration of a rich user interface on the printing apparatus 107 and a poor user interface on the print control apparatus 103. However, by executing an opposite communication sequence, processing for causing the setting information set by the print control apparatus 103 to be reflected on the printing apparatus 107 can also be implemented.

As described above, with the processing shown in FIG. 3, the user need not make the same network settings in the two apparatuses, and the management load on the printing system can be greatly reduced. Since the printing apparatus 107 is connected to the first network 101, it can directly communicate with other apparatuses (apparatuses 111 and 113) connected to the first network 101 without going through the print control apparatus 103. Thus, the developing load of the print control apparatus 103 can be greatly reduced, and the processing load on the print control apparatus 103 itself can also be greatly reduced.

Figure 4:
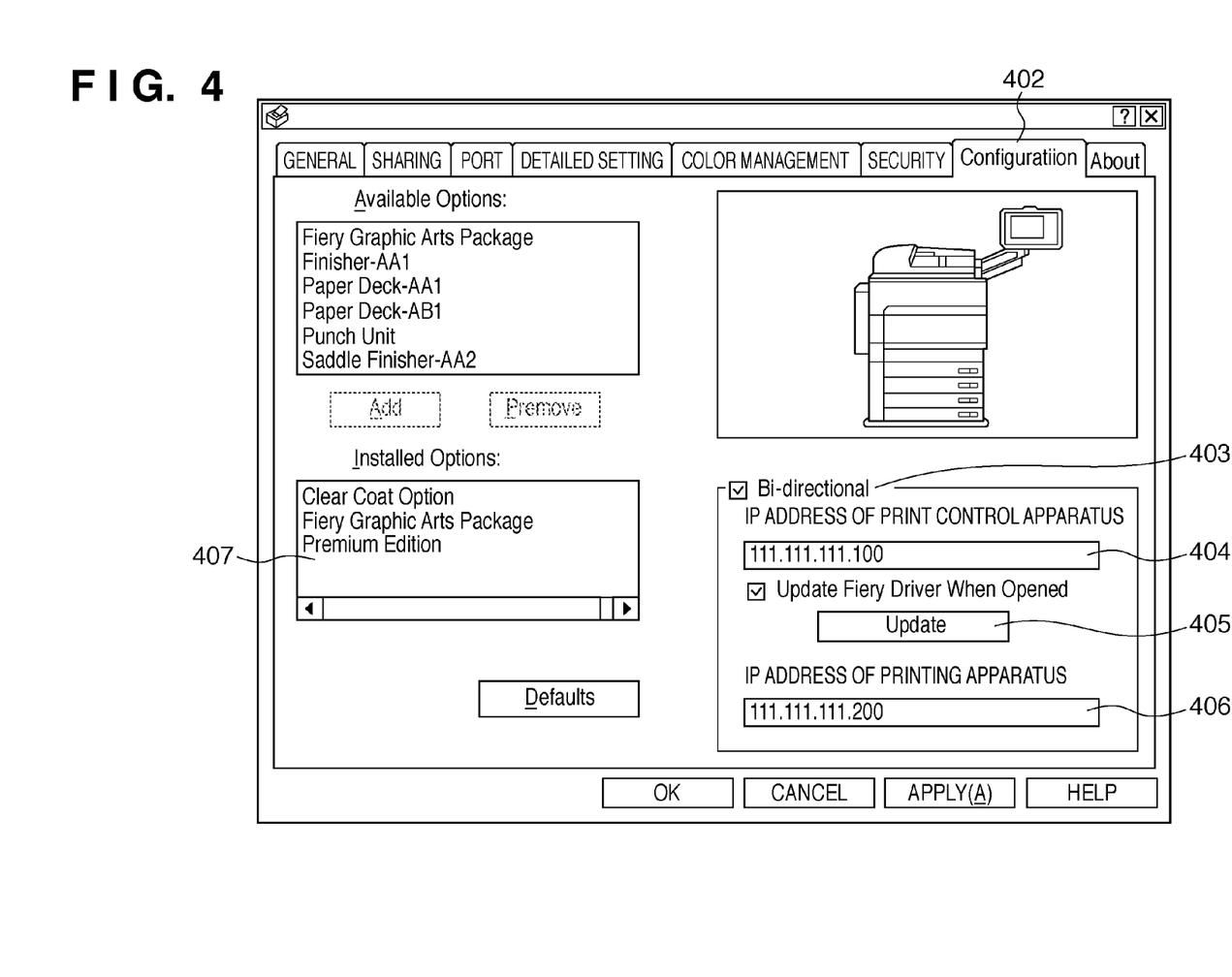
FIG. 4 is a view showing an example of a UI display of a printer driver of an information processing apparatus.
Figure 5:
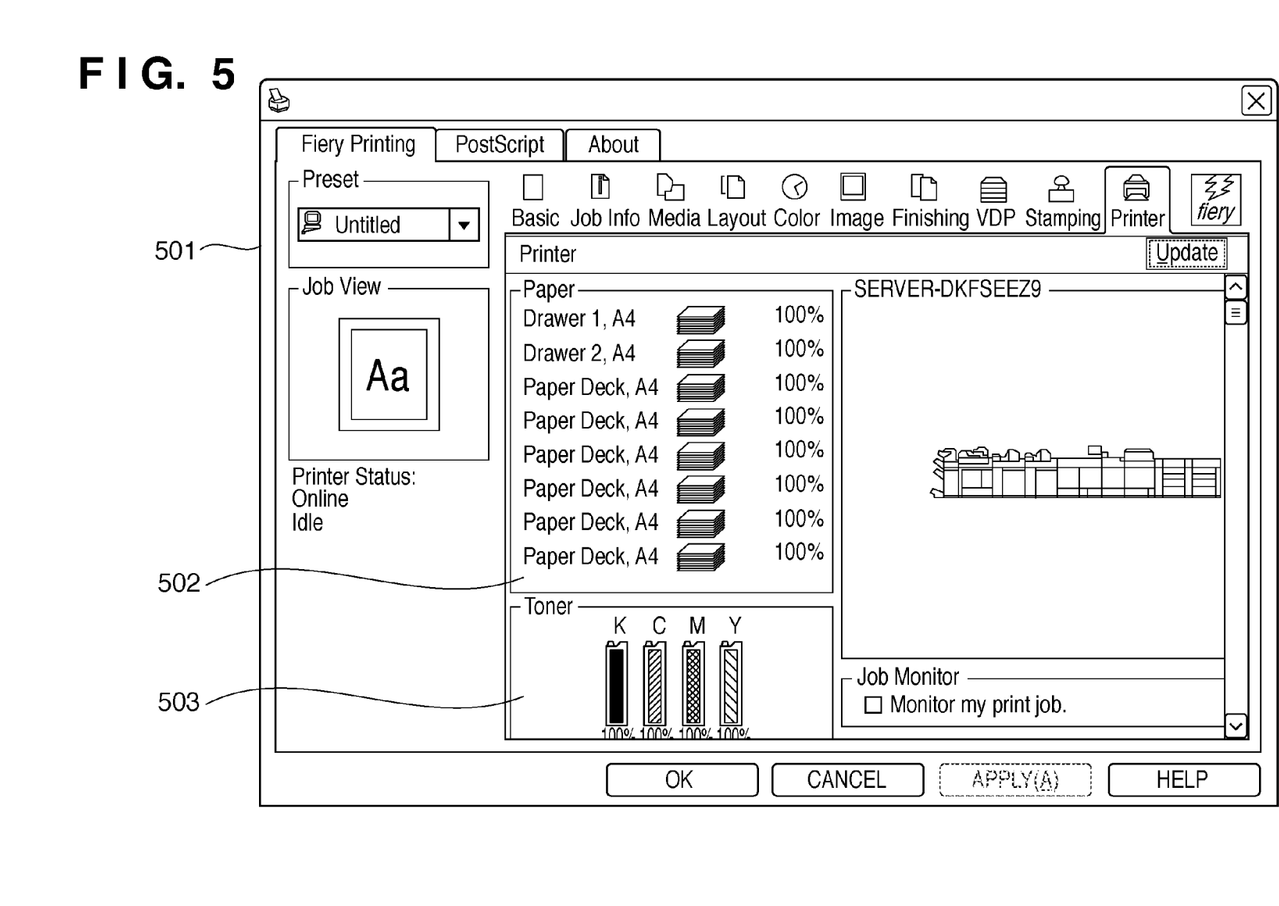
FIG. 5 is a view showing another example of a UI display of the printer driver of the information processing apparatus.

The operation of a printer driver, which runs on the information processing apparatus 111, will be described below. FIGS. 4 and 5 show display examples of a user interface (UI) of the printer driver which runs on the information processing apparatus 111. A UI 402 is used to set configuration information of the printing apparatus 107 which actually outputs an image. A UI 403 is used to control execution of bi-directional communications. A UI 404 is used to set an IP address of the print control apparatus 103. A UI 405 is used to instruct execution of bi-directional communications. A UI 406 is used to set an IP address of the printing apparatus 107. A UI 407 is used to display optional devices attached to the printing apparatus 107. The printer driver sets IP address information of a target apparatus to which print data is to be transmitted at the time of installation. That is, the user provides the IP address of the print control apparatus 103 at the time of installation. The IP address information of the print control apparatus 103 is caused to be reflected in the UI 404, and is used as a target IP address when the printer driver makes bi-directional communications with the print control apparatus 103.

A UI 501 shown in FIG. 5 is used to display status information of the printing apparatus 107 which actually outputs an image. A UI 502 is used to display status information associated with paper sheets of the printing apparatus 107. A UI 503 is used to display status information associated with toners of the printing apparatus 107.

Figure 6:
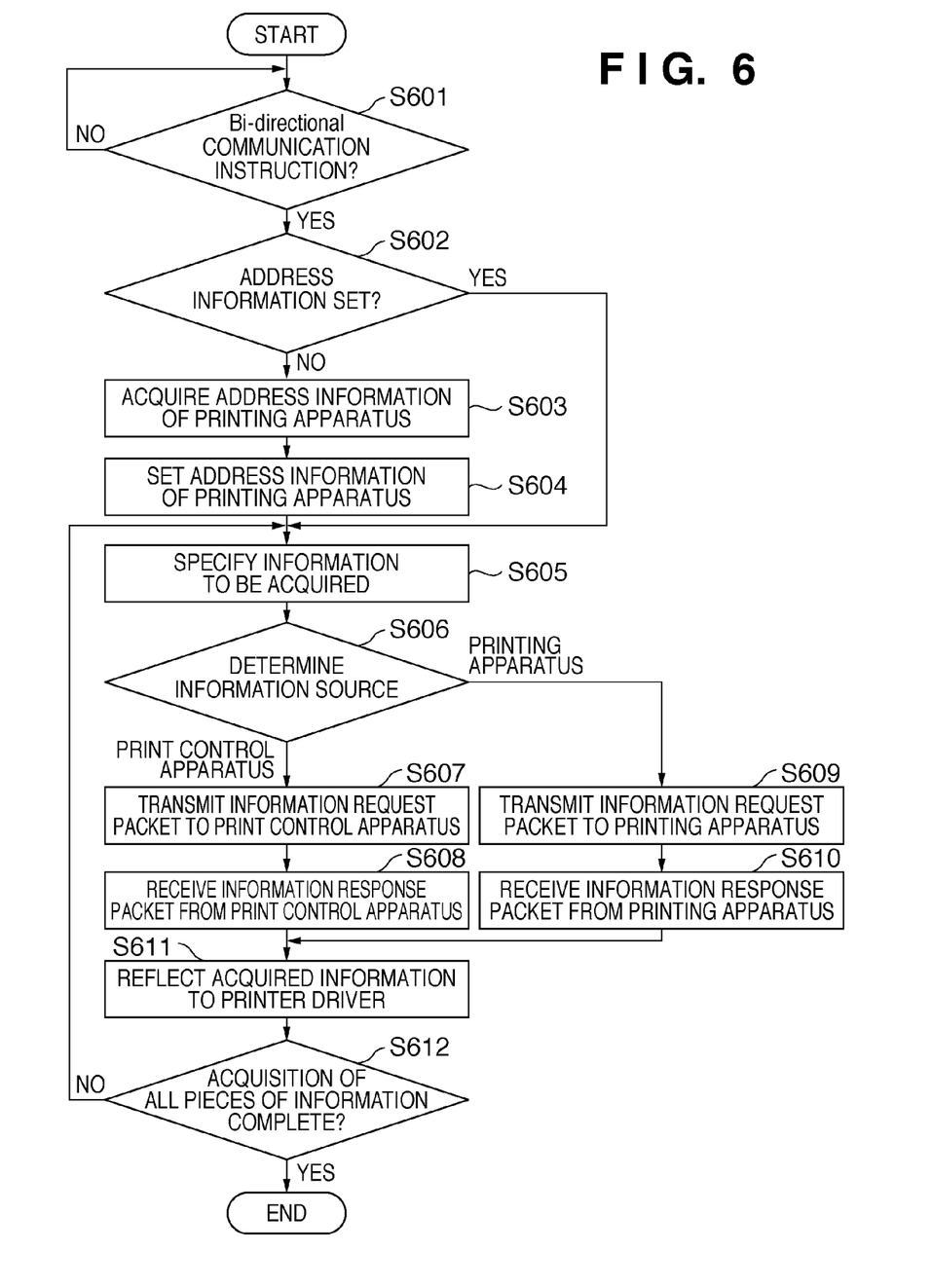
FIG. 6 is a flowchart showing the sequence of UI screen generation processing of the printer driver.

FIG. 6 is a flowchart showing the sequence of screen generation processing of the printer driver executed by the information processing apparatus 111. The printer driver of the information processing apparatus 111 waits for a user's bi-directional communication instruction (S601). The user's bi-directional communication instruction is issued when the user presses the UI 405 of the printer driver. Upon detection of this instruction, the printer driver determines whether or not the IP address of the printing apparatus 107 is set in the UI 406 (S602). If it is determined that the IP address of the printing apparatus 107 is not set, the printer driver makes bi-directional communications with the print control apparatus 103 to acquire the IP address information of the printing apparatus 107 (S603). The print control apparatus 103 has already acquired the IP address information of the printing apparatus 107 by the process described in step S304 in FIG. 3. Therefore, the print control apparatus 103 can return the acquired information to the information processing apparatus 111. The printer driver sets the acquired IP address of the printing apparatus 107 in the UI 406 (S604).

Figure 7:
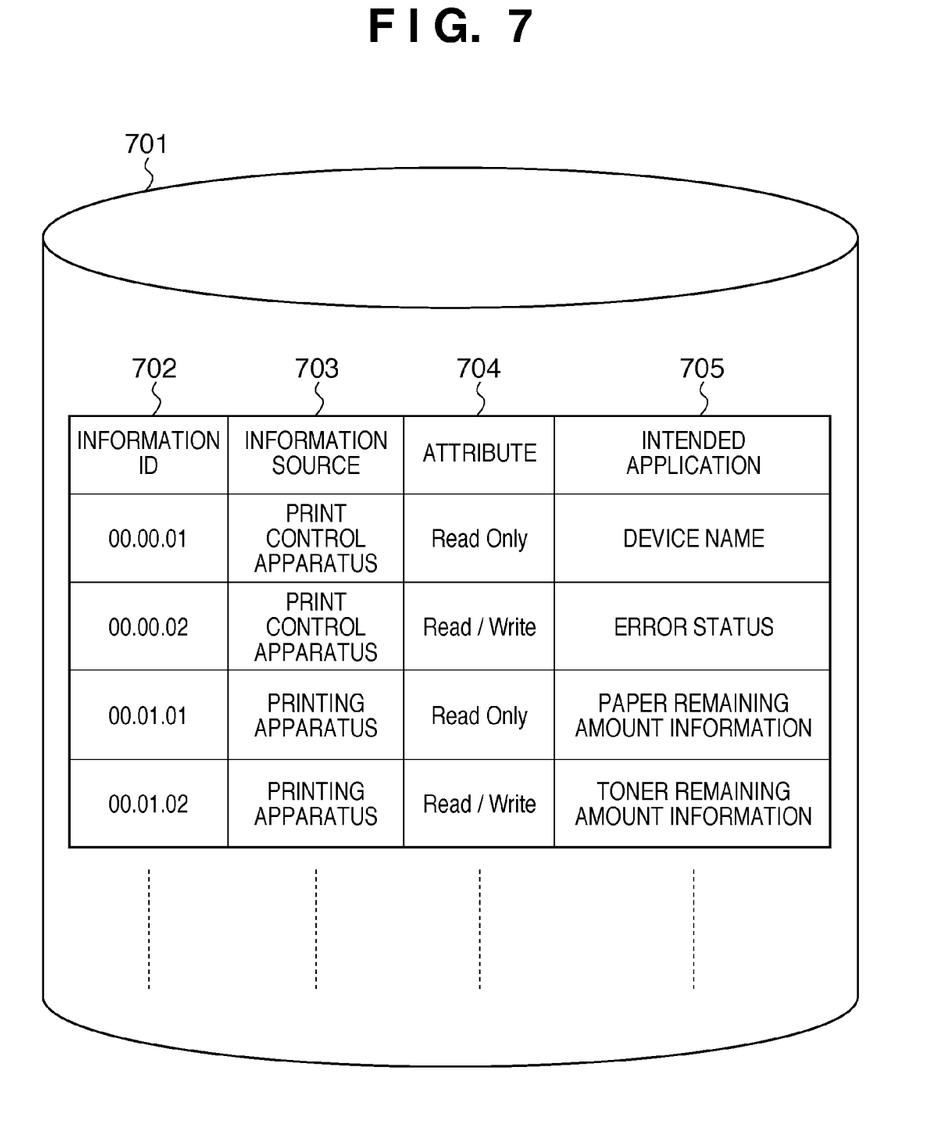
FIG. 7 is a view showing an example of a management database which manages information sources.

The printer driver of the information processing apparatus 111 is required to acquire, for example, the remaining paper amounts of the printing apparatus 107, and information regarding the error statuses of the print control apparatus 103. In step S605, the printer driver specifies information to be acquired from one or more items of required information to be acquired, as shown in FIG. 7 (to be described later) (S605), and determines whether a source of the information is the print control apparatus 103 or printing apparatus 107 (S606). This determination process is implemented based on information in a management database 701 which manages information sources, as shown in FIG. 7. The management database shown in FIG. 7 (to be described later) is a table which stores items of required information to be acquired and their sources in association with each other, and is stored in a storage area of, for example, a ROM of the information processing apparatus 111.

An ID 702 shown in FIG. 7 is used to identify information. Data 703 refers to information regarding an information source. Data 704 refers to attribute information that represents an access authority with respect to the database. Data 705 refers to intended application information indicating an intended application of information. For example, an MIB (Management Information Base) specified by RFC 1213 is suited to a database used to manage such information sources, and is used to implement management in this embodiment. That is, the MIB is a database used to hold status information and setting information of apparatuses to be managed. In this embodiment, these items of information are distributed in the print control apparatus 103 and printing apparatus 107. Hence, the management database 701 which manages information sources shown in FIG. 7 is used to allow the information processing apparatus 111 to determine sources which hold respective items of information.

Referring back to FIG. 6, if it is determined in step S606 with reference to the management database 701 that the information source is the print control apparatus 103, the printer driver transmits an information request packet to the IP address of the print control apparatus 103 set in the UI 404 (S607). Then, the printer driver receives an information response packet transmitted from the print control apparatus 103 (S608).

On the other hand, if it is determined in step S606 with reference to the management database 701 that the information source is the printing apparatus 107, the printer driver transmits an information request packet to the IP address of the printing apparatus 107 set in the UI 406 (S609). Then, the printer driver receives an information response packet transmitted from the printing apparatus 107 (S610).

The information acquired in step S608 or S610 is caused to be reflected in the corresponding UI of the printer driver (S611). If the acquired information is that of an option attached to the printing apparatus 107, that information is caused to be reflected in the UI 407. If the acquired information is that associated with a paper sheet status of the printing apparatus 107, that information is caused to be reflected in the UI 502. If the acquired information is that associated with a toner status of the printing apparatus 107, that information is caused to be reflected in the UI 503. Although not shown, if the acquired information is that associated with a spool job of the print control apparatus 103 or that associated with the progress status of the rasterize processing, such information may be caused to be reflected in UIs that display the statuses of the print control apparatus 103.

The printer driver confirms if acquisition of all items of desired information is complete (S612). If data to be acquired still remain, the process returns to step S605 to repeat the aforementioned processes. On the other hand, if it is determined that acquisition of all items of information is complete, the bi-directional communication processing instructed in step S601 ends. When all items of required information are set in the printer driver, the user can execute print processing from the information processing apparatus 111 to the printing apparatus 107.

As described above, according to this embodiment, setting information set in either the print control apparatus or printing apparatus can be made to be reflected on the other apparatus. Therefore, the burden placed on the user can be reduced compared to the prior art. Also, using the management database shown in FIG. 7, the user of the information processing apparatus 111 can collect various kinds of information distributed to the printing apparatus 107 and print control apparatus 103 as in a case when items of information are held in a single apparatus, and can cause them to be reflected in the printer driver. The management database shown in FIG. 7 may be stored in another information processing apparatus in place of the information processing apparatus 111. In this case, the information processing apparatus 111 communicates with the other information processing apparatus which stores the management database to acquire required information.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-101379, filed Apr. 17, 2009, which is hereby incorporated by reference herein in its entirety.

What is claimed is:

1. A printing system comprising:
    an information processing apparatus that instructs print processing according to settings of a printer driver, the information processing apparatus being connected to a network;
    a printing apparatus connected to the network; and
    a print control apparatus that controls the printing apparatus, the print control apparatus being connected to the network,
    wherein the printing apparatus includes a first acquisition unit configured to acquire apparatus information required to specify the print control apparatus,
    wherein the print control apparatus includes a second acquisition unit configured to acquire apparatus information required to specify the printing apparatus,
    wherein the information processing apparatus includes a third acquisition unit configured to selectively acquire the apparatus information of the print control apparatus from the printing apparatus or the apparatus information of the printing apparatus from the print control apparatus, and
    wherein the third acquisition unit:
        determines, with reference to a database that stores data to be set in the printer driver and information indicating an acquisition source of the data in association with each other, whether the data to be set in the printer driver is to be acquired from the printing apparatus or the print control apparatus,
        if the data is determined to be acquired from the printing apparatus, acquires the data from the printing apparatus, and, if the data is determined to be acquired from the print control apparatus, acquires the data from the print control apparatus, by using the acquired apparatus information, and
        reflects the acquired data in the settings of the printer driver.

2. The printing system according to claim 1, wherein the apparatus information includes at least one of an IP address, an apparatus name, and an apparatus serial number.

3. A screen generation method of a user interface of a printer driver, the method being executed in a printing system in which an information processing apparatus that instructs print processing according to settings of a printer driver, a printing apparatus, and a print control apparatus that controls the printing apparatus are connected to a network, the screen generation method comprising steps of:
    in the printing apparatus, a first acquisition unit acquiring apparatus information required to specify the print control apparatus;
    in the print control apparatus, a second acquisition unit acquiring apparatus information required to specify the printing apparatus;
    in the information processing apparatus, a third acquisition unit:
        selectively acquiring the apparatus information of the print control apparatus from the printing apparatus or the apparatus information of the printing apparatus from the print control apparatus,
        determining, with reference to a database that stores data to be set in the printer driver and information indicating an acquisition source of the data in association with each other, whether the data to be set in the printer driver is to be acquired from the printing apparatus or the print control apparatus,
        if the data is determined to be acquired from the printing apparatus, acquiring the data from the printing apparatus, and, if the data is determined to be acquired from the print control apparatus, acquiring the data from the print control apparatus, by using the acquired apparatus information, and
        causing the acquired data to be reflected in the settings of the printer driver.

4. The screen generation method according to claim 3, wherein the apparatus information includes at least one of an IP address, an apparatus name, and an apparatus serial number.

5. An information processing apparatus, which is connected, via a network, to a printing apparatus and a print control apparatus that controls the printing apparatus, and which instructs print processing according to settings of a printer driver, the information processing apparatus comprising:
- an acquiring unit configured to selectively acquire apparatus information of the print control apparatus from the printing apparatus or apparatus information of the printing apparatus from the print control apparatus;
- a determination unit configured to determine, with reference to a database that stores data to be set in the printer driver and information indicating an acquisition source of the data in association with each other, whether the data to be set in the printer driver is to be acquired from the printing apparatus or the print control apparatus, based on the apparatus information acquired by the acquiring unit; and
- a reflection unit configured to, if the data is determined to be acquired from the printing apparatus, acquire the data from the printing apparatus, and, if the data is determined to be acquired from the print control apparatus, acquire the data from the print control apparatus, and to reflect the acquired data in the settings of the printer driver.

6. The information processing apparatus according to claim 5, wherein the apparatus information includes at least one of an IP address, an apparatus name, and an apparatus serial number.

7. A control method executed by an information processing apparatus, which is connected, via a network, to a printing apparatus and a print control apparatus that controls the printing apparatus, and which instructs print processing according to settings of a printer driver, the control method comprising steps of:
- selectively acquiring apparatus information of the print control apparatus from the printing apparatus or apparatus information of the printing apparatus from the print control apparatus;
- determining with reference to a database that stores data to be set in the printer driver and information indicating an acquisition source of the data in association with each other, whether the data to be set in the printer driver is to be acquired from the printing apparatus or the print control apparatus, based on the apparatus information acquired in the acquiring step;
- if the data is determined to be acquired from the printing apparatus, acquiring the data from the printing apparatus, and, if the data is determined to be acquired from the print control apparatus, acquiring the data from the print control apparatus; and
- reflecting the acquired data in the settings of the printer driver.

8. The control method according to claim 7, wherein the apparatus information includes at least one of an IP address, an apparatus name, and an apparatus serial number.

9. A non-transitory computer-readable recording medium storing a computer program that when executed causes a computer to perform the screen generation method recited in claim 3.

10. A non-transitory computer-readable recording medium storing a computer program that when executed causes a computer to perform the control method recited in claim 7.

* * * * *